United States Patent [19]

Obra

[11] Patent Number: 4,569,240

[45] Date of Patent: Feb. 11, 1986

[54] MOTION GENERATING MECHANISM

[75] Inventor: Bart R. Obra, St. Clair Shores, Mich.

[73] Assignee: Easom Engineering & Manufacturing Corp., St. Clair Shores, Mich.

[21] Appl. No.: 586,290

[22] Filed: Mar. 5, 1984

[51] Int. Cl.[4] .............................................. F16H 35/02
[52] U.S. Cl. ...................................... 74/394; 74/52; 192/56 R
[58] Field of Search ................. 74/52, 394; 192/56 R

[56] References Cited

U.S. PATENT DOCUMENTS

| | | | |
|---|---|---|---|
| 3,282,387 | 11/1966 | Becker et al. | 192/56 R |
| 3,599,067 | 8/1971 | Wallis | 192/56 R |
| 3,857,292 | 12/1974 | Brems | 74/52 |
| 4,020,708 | 5/1977 | Obra | 74/52 |
| 4,089,228 | 5/1978 | Obra | 74/52 |
| 4,269,076 | 5/1981 | Obra | 74/52 |
| 4,373,923 | 2/1983 | Kilwin | 192/56 R |

FOREIGN PATENT DOCUMENTS 1129029  5/1962  Fed. Rep. of Germany ........ 74/394

Primary Examiner—Alan Cohan
Assistant Examiner—Stephen M. Hepperle
Attorney, Agent, or Firm—Basile, Weintraub & Hanlon

[57] ABSTRACT

A motion generating mechanism having a gear and rack (or alternately a sprocket and chain) output comprises a housing mounting a prime mover coupled through a gear to drive a primary rotary member about a first fixed axis in which a sun gear is concentrically disposed. The primary rotary member carries one or more roller gears that are engaged by the sun gear such that the roller gears rotate about a second axis which is parallel to the first axis and angularly movable with respect to the first axis as the primary gear is driven by the electric motor. Each roller gear has an inner portion on which is mounted a crank shoe adapted to movably engage a slotted section formed in a plate member that is, in turn, adapted to drive a gear that is axially displaced from the axis of rotation of the plate member. The gear, in turn, in connected to a gear step-up member drive for driving the gear and rack (or sprocket and chain) assembly.

3 Claims, 2 Drawing Figures

MOTION GENERATING MECHANISM

BACKGROUND OF THE INVENTION

I. Field of the Invention

The present invention relates to cyclically repetitive motion generating mechanisms and, in particular, to a mechanism which will generate a rotary output for driving a gear rack in a prescribed motion.

II. Description of the Prior Art

U.S. Pat. Nos. 4,089,228, 4,020,708 and 4,269,076 are each related to the present disclosure and are incorporated herein by reference. As indicated in the aforementioned patents, numerous apparatuses and devices have been utilized to provide a desired motion of an output member along a prescribed path, such as a linear indexing mechanism of the type disclosed in U.S. Pat. No. 3,857,292, which is designed to achieve cycloidal motion of an output member along a linear path. Other mechanisms disclosed in the prior art generally achieve such cyclically repetitive motion by utilizing complicated cam grooves and followers to accomplish predetermined acceleration, deceleration, dwell and reversing characteristics of the output member. No system, to the knowledge of the inventor, provides a simple means for accomplishing the predetermined, hereinafter described characteristics for a gear and rack output arrangement.

SUMMARY OF THE INVENTION

The present invention, which will be described subsequently in greater detail, comprises a mechanism for achieving a combined epicycloidal and harmonic output motion for a gear and rack or sprocket and chain assembly such that the rack or chain will move along a linear path with predetermined characteristics.

The mechanism comprises a housing that carries a primary gear mounted for rotation about a fixed first axis and a prime mover which engages and drives the primary gear. The primary gear, in turn, carries one or more secondary gears, each of which is adapted for rotation about a second axis that is both parallel and movable with respect to the first axis. Motion imparting means are provided for engaging the secondary gear to rotate the same about the second axis as the primary gear is rotated. A rotary member carried by the housing is coupled to the secondary gear by means of a coupling member which functions to rotate the rotary member in a prescribed manner. The rotary member, in turn, is coupled to an output gear that rotates therewith and through a suitable step-up gearing arrangement and drives a rack or chain.

It is therefore an object of the present invention to provide a mechanism which, with a simple constant velocity input, will produce a combined epicycloidal and harmonic output motion for a gear and rack or sprocket and chain assembly.

It is a further object of the present invention to provide a mechanism which is relatively simple in construction, compact in size and which operates within an enclosed environment having the operating characteristics of the devices disclosed in the aforementioned U.S. Pat. Nos. 4,089,228, 4,020,708 and 4,269,076.

Other objects, advantages and applications of the present invention will become apparent to those skilled in the art of motion generating mechanisms of the type disclosed herein when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
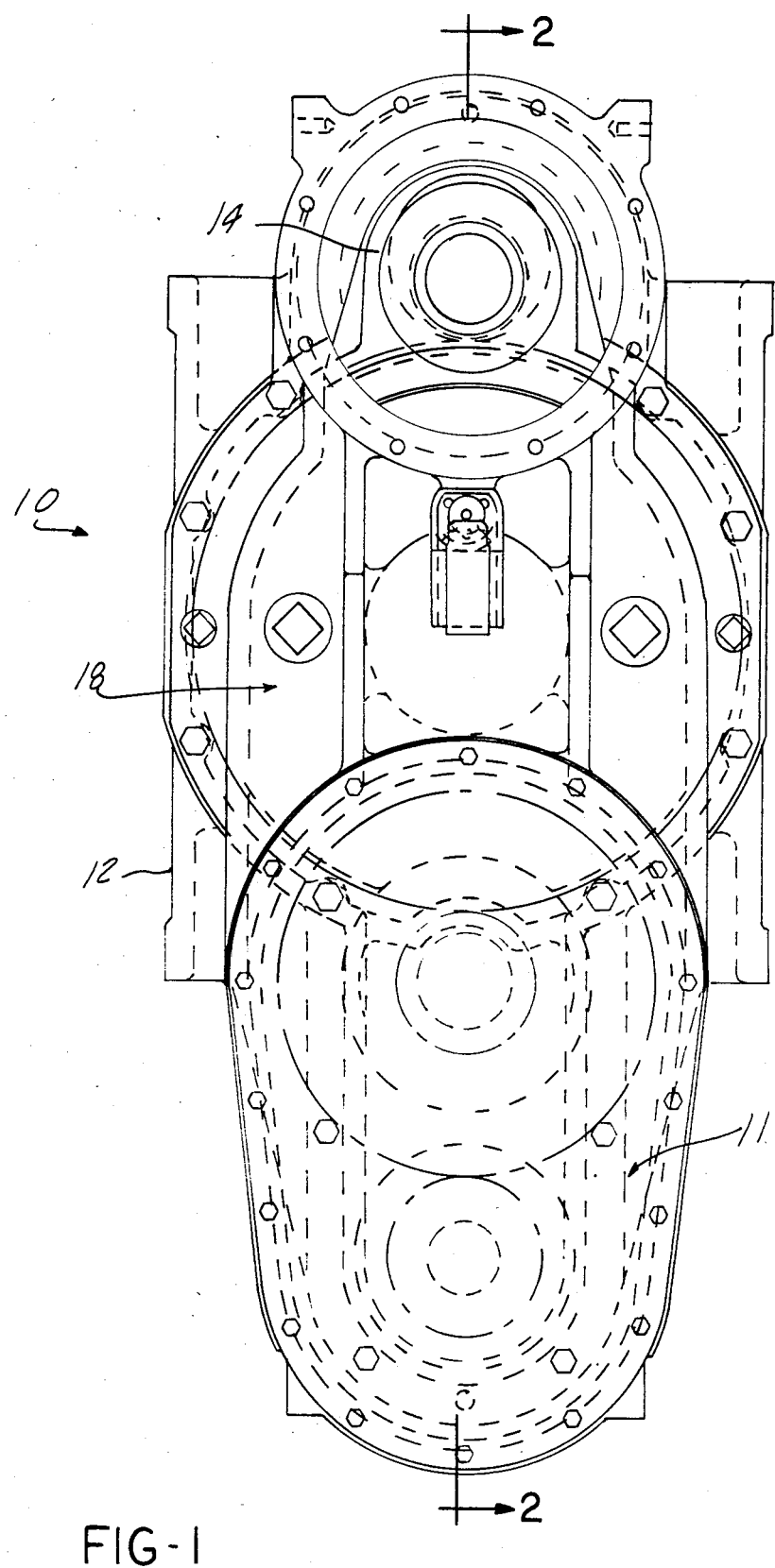
FIG. 1 is a plan view of a motion generating mechanism constructed in accordance with the principles of the present invention.
Figure 2:
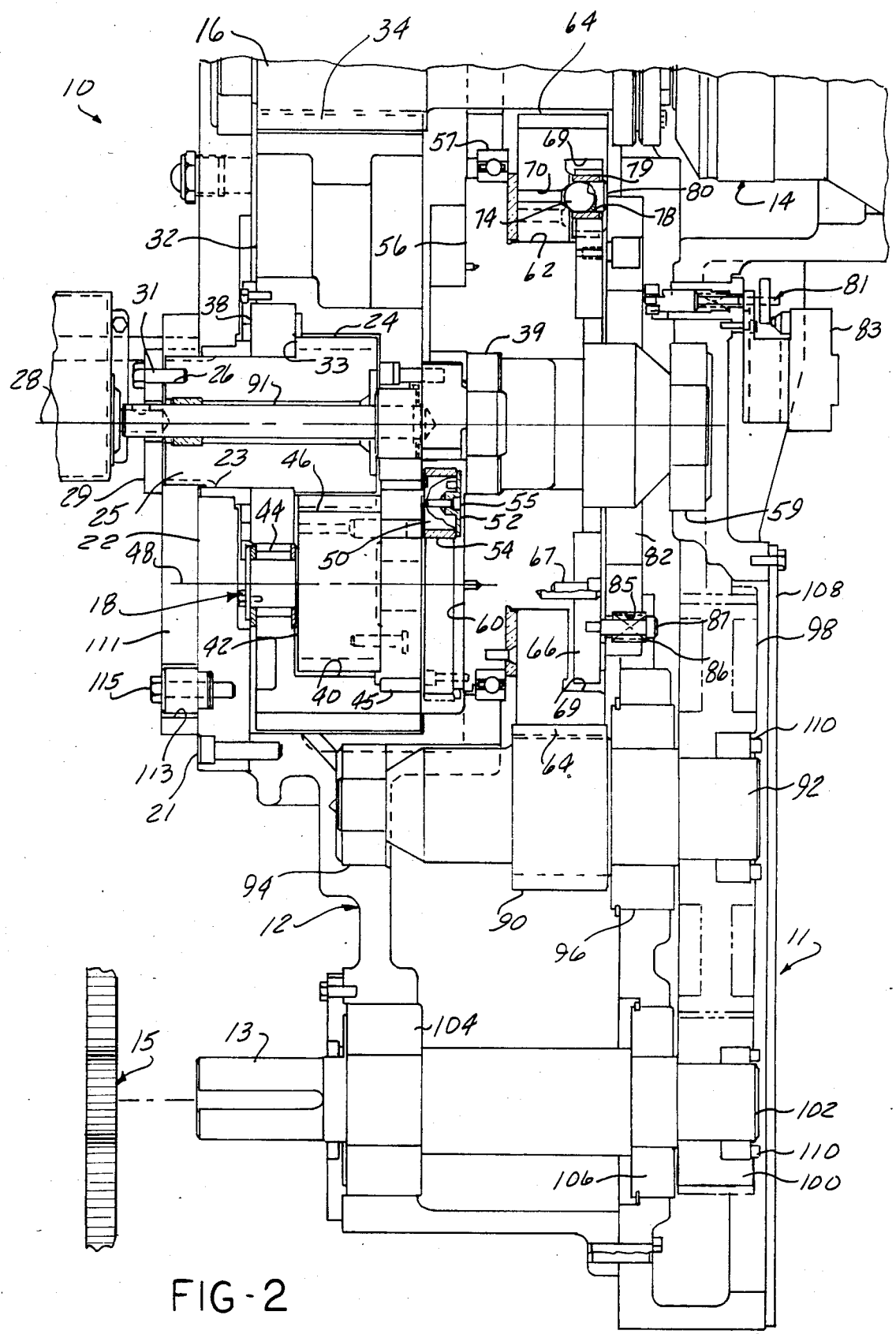
FIG. 2 is a cross-sectional view of the mechanism taken generally along line 2—2 of FIG. 1.

Referring now to the drawings and, in particular, to FIG. 2, wherein there is illustrated one example of the present invention in the form of a motion generating mechanism 10 having a step-up gear means 11, the output shaft 13 of which is adapted to drive a gear and rack assembly schematically illustrated at 15. The output shaft 13 can be adapted to drive a sprocket and chain assembly. The mechanical mechanism 10 comprises a housing 12 that is adapted to support a prime mover 14, a combined epicycloidal and harmonic motion generating mechanism 18 and the step-up gear means 11, all of which will be described in greater detail hereinafter. The prime mover 14 may be an electric motor which drives a pinion gear 16 geared to drive an outer gear 34 of a primary rotary member 32.

The housing 12 includes an enclosure plate 22 that is secured to the housing by suitable fasteners, such as bolts 21. The enclosure plate 22 supports a fixed sun gear 24 which, as will be described, may be selectively rotated within a bore 23. The bore 23 slidably receives a shaft 25 which is an integral extension of the lower end of the gear 24. Threaded apertures 26 in the projecting end of the shaft 25 are alignable with bores in a retaining plate 29 so as to receive suitable fastening members 31 therethrough and secure plate 29 and a dwell position adjustment arm 111 to the shaft 25. The arm 111 includes an arcuate slot 113 through which a fastener 115 extends. The arm is rotatable about axis 28 and is fixed in selected positions relative to plate 22 by means of fastener 115.

A bearing 38 is supported on the shaft 25 wherein one end of the inner race of the bearing 38 abuts a shoulder 33 on the sun gear 24 and the other end abuts and is supported by the enclosure plate 22. The tightening of the bolts 31 brings the dwell position adjustment arm 111 in abutment with the enclosure plate 22, supporting the sun gear 24 in a fixed position with respect to the enclosure plate 22. The dwell position adjustment arm 111 serves as a means for adjusting the dwell position, the details of which were disclosed in the aforementioned U.S. Pat. No. 4,269,076. The non-rotating sun gear 24 is concentric about a first fixed axis 28.

As aforementioned the mechanism 18 comprises a primary rotary member 32 having an outer gear 34 formed on the outer surface thereof and which is drivingly engaged by the pinion gear 16. The primary rotary member 32 is supported concentrically about the fixed axis 28 for rotation thereabout by means of the bearings 38 and 39. It can thus be seen that when the pinion gear 16 rotates to drive the outer gear 34 of the primary rotating member 32, the same will rotate about the fixed axis 28 concentric with the sun gear 24.

The primary rotating member 32 is provided with a plurality (only one of which is shown) of arcuately spaced step bores 40, each of which rotatably supports secondary rotary members 42 by means of bearings 44 and 45, both of which are carried by the primary rotating member 32. It should be understood that while only one rotary member 42 is illustrated in FIG. 2, the present invention may be constructed with one or more such rotary members 42, depending upon the size of the load to be powered by the mechanism 10, and only one such rotary member 42 will be described; however, it should be understood that the description herein is equally applicable to the remaining rotary members 42. As shown in FIG. 2, the secondary rotary member 42 has an inner portion on which is formed a roller or planetary gear 46 that is adapted to mesh with the non-rotating sun gear 24. Thus, it can be seen that as the drive pinion gear 16 rotates the primary rotary member 32 about the fixed axis 28, the engagement of the roller gear 46 with the sun gear 24 will result in the rotation of the secondary rotary member 42 about a second axis 48. The gear 46 is concentric about the second axis 48 which, in turn, is parallel to the fixed axis 28 but angularly movable with respect to the fixed axis 28 as the primary rotating member 32 rotates. It should be noted that, depending upon the ratio between the non-rotating sun gear 24 and the planetary or roller gear 46, various dwells per revolution can be produced. Any ratio may be established between the sun gear and the planetary gear which will result in a varying number of dwells per revolution. For example, if a 2:1 ratio exists, then two dwells per revolution will be provided. A 1:1 ratio between the sun gear and the planetary gear will provide one dwell per revolution; a 4:1 ratio between the sun gear and the planetary gear will provide four dwells per revolution.

Still referring to FIG. 2, the inner portion of the secondary rotary member 42 is provided with a pin 50 having an axis parallel to the axis 48 of the rotary member 42. The outer end of the pin 50 rotably supports a crank shoe 54, while an upper plate 52 provided with an aperture is configured to receive a recessed screw 55 which, in turn, is received within a threaded bore in the end of the pin 50 so as to hold the plate 52 and the crank shoe 54 in position. The manner in which this crank shoe 54 operates and its position with respect to the pitch line of the roller gear 46 is described in more detail in the aforementioned U.S. Pat. No. 4,269,076 which uses an equivalent structure in the form of a roller.

The mechanism 18 further comprises a slotted plate member 56 supported on bearings 57 and 59 which, in turn, are carried by the housing 12. The inner face of the slotted plate member 56, that is, the face adjacent the crank shoes 54, is provided with a plurality of radially disposed slots 60 which slidably receive the crank shoes 54. It can thus be seen that as the primary rotating member 32 is rotated so as to cause a rotational movement of the secondary rotating members 42 about their respective axes 48, the sliding engagement of the crank shoes 54 in their respective slots 60 will rotate the slotted plate member 56 about the axis 28 with the motion having acceleration characteristics described in the aforementioned United States Patents.

The slotted plate member 56 has a peripheral step 62 along its outer surface and configured to rotatably support a gear 64 which is adapted to rotate about the axis 28. A keeper ring 66 is secured to the outer surface of the slotted plate member 56 by means of a plurality of fastening means 67. The gear 64 has an outer recess 69 that extends inwardly from its inner diameter and accommodates positioning of the keeper ring 66 therein, the two being spaced from each other a sufficient distance so as not to interfere when, as will be described hereinafter, relative rotary motion occurs between the two members. The recessed surface 69 of the gear 64 has a plurality of tapered bores 70 disposed in an arcuate manner, and each tapered bore 70 is configured to nestingly receive a ball member 74 that is longitudinally movable within an associated bore 78 disposed within the keeper ring 66. Each bore 78 comprises a bushing 79 retained therein by friction. The bore of the bushing slidingly surrounds the diameter of the ball 74. A push rod 80 is slidably received by the inside diameter of the bushing 79. The push rod 80 has a flat end that projects outwardly from the outer side of the keeper ring 66 while its inner end is concavely shaped to engage the ball 74, urging the ball 74 into nesting contact with the tapered bore 70 when a downward force is exerted thereon, as will be described hereinafter.

Longitudinally offset from the keeper plate 66 there is provided a spring plate 82. Th spring plate 82 has disposed in an arcuate manner around its periphery a plurality of step bores 85, each of which accommodates within its larger diameter a compression spring 86, one end of which rests upon the bottom of the step bore 85, the other end of which is compressed by a shoulder bolt 87 which is threadingly received by a plurality of apertures in the keeper plate 66 that are appropriately in line with the step bores 85. The compression of the spring 86 urges the spring plate 82 into abutment with the push rod 80 which, in turn, urges the balls 74 into nesting engagement with the tapered bores 70. Thus when the balls 74 are engaged with the tapered bores 70, the slotted plate member 56 and the gear 64 rotate as a unit about the axis 28.

It can readily be seen that when excessive torque is exerted by the slotted plate member 56, such as when the output shafts of the step-up gears are jammed and the gear 64 does not turn, the balls 74 are disengaged from the tapered bores 70 which urges the spring plate to compress the spring 86 and allow movement of the slotted plate member 56 relative to the gear 64. The amount of compression of the spring 86 and the number of springs employed to urge the spring plate 82 against the push rod 80 and against the balls 74 will determine the maximum torque that can be transmitted between the slotted plate member 56 and the gear 64. A suitable sensing device indicated by the numeral 81 senses the outward movement of the spring plate 82 and transmits this movement to a limit switch 83 designed to disengage or otherwise terminate power to the prime mover 14, thereby preventing damage to the mechanism 10 in the event jamming occurs, as aforementioned. It should be noted that the inner portion of the slotted plate member 56 has a shaft 91 that extends through the fixed gear 24 and its associated shaft 25 and externally of the mechanism 10 for engagement with a suitable electrode-mechanical rotary cam limit switch which may be utilized to sense the number of turns of the member 32.

The gear 64 engages a gear 90 rotatably mounted upon a shaft 92 which, in turn, is carried by the housing 12 by means of bearings 94 and 96. The outer end of the shaft 92 carries a larger gear 98, the output of which drivingly engages a gear 100 carried at one end of shaft 102 supported by the housing 12 by bearings 104 and 106. The shaft 102 extends externally of the housing 12 and mounts the gear and rack (or sprocket an chain) assembly 15 described hereinbefore. The aforementioned described arrangement provides a very simple step-up gear means 11 converting the output of the gear 64 into a desired multiplication of revolutions for driving the gear and rack (or sprocket and chain) assembly 15. In the preferred embodiment, the output shaft will rotate 12 times for each revolution of the gear 64.

The gears 98 and 100 are attached to their respective shafts 92 and 102 in such a manner that they may be simply removed by first removing the access plate 108 from the housing 12 and then by loosening bolts 110 that attach the gears to their respective shafts. By replacing the removed gears with different sized gears, a large variety of gear ratios may be had without having to remove the primary shafts 92 and 102. Thus, the basic mechanism 10 may be utilized for a large variety of applications requiring only small modifications prior to its installation in the desired application.

It can thus be seen that the present invention has provided a new and improved mechanism which, with a simple constant velocity input, will produce a combined epicycloidal and harmonic rotary output motion and through a unique step-up gear arrangement can be used to drive a gear and rack (or sprocket and chain) assembly having desired output characteristics.

It should be understood by those skilled in the art of motion generating mechanisms that other forms of the present invention may be had, all coming within the spirit of the invention and scope of the appended claims.

What is claimed is:

1. A motion generating mechanism comprising:
a support frame;
a first rotary member carried by said support frame for rotation about a fixed first axis;
first driving means for driving said first rotary member;
a second rotary member carried by said first rotary member and rotatable therewith about said first axis as said second rotary member rotates about a second movable axis that is parallel to said first axis;
rotation inducing means carried by said support frame, a third rotary member carried by said frame for rotation about said first axis, said third rotary member being axially spaced from said first and second rotary members, said third rotary member having a first side thereof adjacent said second rotary member, said first side having a radial slot, said third rotary member having a second side axially spaced from said one side; a coupling member carried by said second rotary member and disposed along an axis which is spaced from said second axis, said coupling member movably engaging said third rotary member slot to rotate said third rotary member about said first axis as said second rotary member rotates whereby the motion of said third rotary member varies in a predetermined manner relative to the acceleration and velocity of said first driving means;
means for adjusting the angular position of said third rotary member relative to said support frame comprising; said motion inducing means supported in a bore formed along said first axis, a lever attached to said motion inducing means, and means for securing said lever to said support frame in a plurality of positions,
a circular gear member having an outer peripheral surface defining a gear and inner circular bore, said third rotary member having a circular recess along its outer periphery receiving and supporting said gear member for relative rotational movement, with said second side of said third rotary member projecting through said gear member bore such that said gear member is positioned between said third rotary member sides, said third rotary member having a second overlying a portion of said gear member;
a torque transmitting means disposed between said section and said gear member for releasably securing said gear member to said third rotary member such that said gear member and said third rotary member normally rotate as a unit around said first axis and said gear member and said third rotary member rotate relative to each other when the torque between said last-mentioned members exceeds a predetermined amount;
means sensing said relative rotational movement for controlling said first driving means;
an output shaft; and
rack and pinion means mechanically connecting said gear member to said output shaft converting output shaft rotary motion to linear motion.

2. The motion generating mechanism of claim 1 wherein the torque transmitting means comprises:
one or more balls biased into nesting engagement with a plurality of tapered bores formed in a first plate;
a plurality of bores formed in a second plate axially spaced from said first plate, said plurality of bores slidingly engaging said balls; and
wherein said balls are disengaged from said tapered bores allowing angular movement between said first and second plates when a predetermined torque between plates is reached.

3. The motion generating mechanism of claim 1 wherein the means for converting the rotary output of said third rotary member to linear motion comprises a sprocket and chain.

* * * * *